(12) United States Patent
Al-Shyoukh et al.

(10) Patent No.: US 9,450,484 B2
(45) Date of Patent: Sep. 20, 2016

(54) STARTUP CIRCUIT AND METHOD FOR AC-DC CONVERTERS

(71) Applicant: TAIWAN SEMICONDUCTOR MANUFACTURING COMPANY, LTD., Hsinchu (TW)

(72) Inventors: Mohammad Al-Shyoukh, Cedar Park, TX (US); Percy Neyra, Austin, TX (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 347 days.

(21) Appl. No.: 13/771,586

(22) Filed: Feb. 20, 2013

(65) Prior Publication Data

US 2014/0233283 A1 Aug. 21, 2014

(51) Int. Cl.
*H02M 3/335* (2006.01)
*H02M 1/32* (2007.01)
*H02M 7/5387* (2007.01)
*H02M 1/36* (2007.01)

(52) U.S. Cl.
CPC .......... *H02M 1/36* (2013.01); *H02M 3/33507* (2013.01)

(58) Field of Classification Search
CPC .... H02M 3/33592; H02M 1/36; H02M 1/32; H02H 7/127
USPC ............... 363/21.06, 21.14, 127, 49, 50, 52, 363/56.01, 56.02; 323/901
See application file for complete search history.

(56) References Cited

U.S. PATENT DOCUMENTS

| 5,459,652 | A | * | 10/1995 | Faulk | 363/49 |
|---|---|---|---|---|---|
| 6,069,805 | A | * | 5/2000 | Anderson, Jr. | 363/49 |
| 6,154,375 | A | * | 11/2000 | Majid et al. | 363/16 |
| 7,221,128 | B2 | * | 5/2007 | Usui | H02M 3/33507 323/207 |
| 7,619,397 | B2 | | 11/2009 | Al-Shyoukh | |
| 8,525,506 | B2 | * | 9/2013 | Nagatomo | G05F 3/242 323/313 |
| 8,629,631 | B1 | * | 1/2014 | Rhodes et al. | 315/307 |
| 2004/0037098 | A1 | * | 2/2004 | Konno | 363/49 |
| 2007/0146046 | A1 | * | 6/2007 | Tai et al. | 327/430 |
| 2010/0244804 | A1 | * | 9/2010 | Zong et al. | 323/299 |

* cited by examiner

*Primary Examiner* — Timothy J Dole
*Assistant Examiner* — Sisay G Tiku
(74) *Attorney, Agent, or Firm* — Hauptman Ham, LLP

(57) ABSTRACT

An AC-DC power converter includes a rectifying unit for generating a rectified voltage, an output stage for converting the rectified voltage into a DC voltage for a load, a controller for controlling the output stage, and a start-up circuit. The start-up circuit includes a start-up voltage generator coupled to the rectifying unit and configured to generate a start-up voltage from the rectified voltage and to output the start-up voltage to the controller to provide power for operation of the controller before the output stage starts outputting power. The start-up voltage generator includes a first depletion mode transistor having a first terminal configured to receive the rectified voltage, a second terminal configured to output at least partially the start-up voltage, and a gate terminal which is grounded.

20 Claims, 7 Drawing Sheets

US 9,450,484 B2

STARTUP CIRCUIT AND METHOD FOR AC-DC CONVERTERS

RELATED APPLICATION(S)

The instant application is related to U.S. patent application Ser. No. 13/598,288, filed Aug. 29, 2012, and titled "START-UP CIRCUIT AND METHOD FOR AC-DC CONVERTERS," the entire content of which is incorporated by reference herein.

The instant application is further related to U.S. patent application Ser. No. 13/672,304, filed Nov. 8, 2012, and titled "START-UP CIRCUIT AND METHOD WITH SOFT-START SCHEME FOR AC-DC CONVERTERS," the entire content of which is incorporated by reference herein.

BACKGROUND

AC-DC power converters are used in many applications, including consumer electronics, LED lighting, and other kinds of electrical or electronic devices. In a typical application, the AC-DC power converter produces a regulated DC output from an AC input which comes from the utility grid. The regulated DC output is either a voltage as in power supply applications, or a current as in emerging LED lighting applications.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
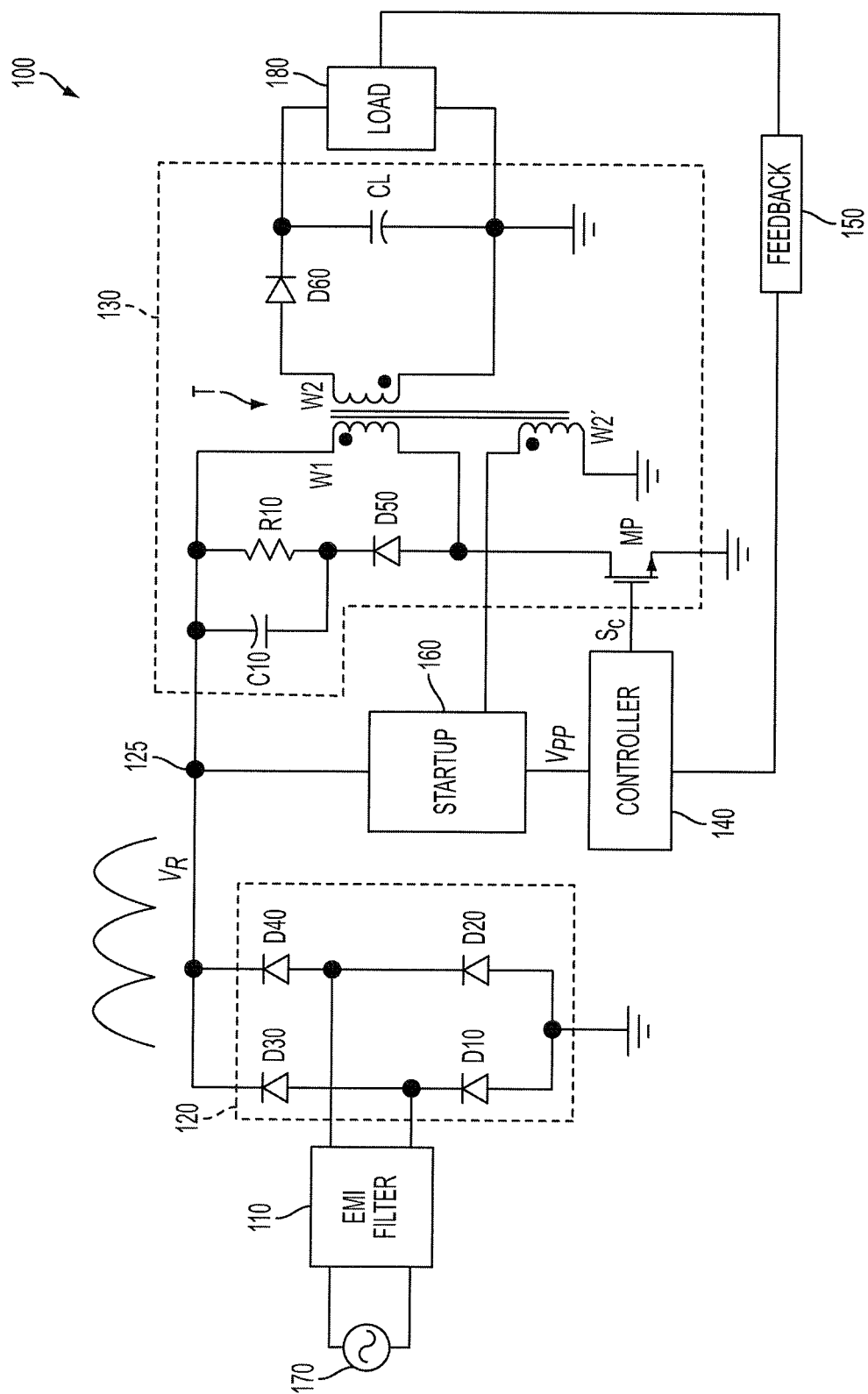
FIG. 1 is a schematic circuit diagram of a power converter in accordance with some embodiments.

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent; however, that one or more embodiments may be practiced without these specific details. Like reference numerals in the drawings denote like elements.

Some embodiments describe a start-up circuit for a power converter. The start-up circuit uses one or more depletion mode transistors to generate a start-up voltage from a rectified voltage, for powering a controller of the power converter before an output stage of the power converter starts operating. In one or more embodiments, multiple depletion mode transistors are coupled in cascade into a start-up voltage generator for generating the start-up voltage. In at least one embodiment, a simple change of a number of the depletion mode transistors coupled in cascade also changes the start-up voltage, which simplifies the process of designing the start-up circuit for a specific power converter configuration. In at least one embodiment, the process of manufacturing a start-up circuit using one or more depletion mode transistors is simplified, compared to other approaches where a start-up circuit uses other components, such as zener diodes.

FIG. 1 is a schematic circuit diagram of a power converter 100 in accordance with some embodiments. The power converter 100 includes an electromagnetic interference (EMI) filter 110, a rectifying unit 120, an output stage 130, a controller 140, a feedback circuit 150, and a start-up circuit 160. In some embodiments, the power converter 100 is implemented wholly or partly on a single integrated circuit (also referred to as chip), or on a multi-chip structure. In some embodiments, one or more components of the power converter 100 are configured as discrete components and are mounted on a printed circuit board (PCB) having conductive traces that connect the discrete components to the chip or chips containing the remaining components.

The EMI filter 110 is coupled to a power source 170. In one or more embodiments, the power source 170 is an AC power source, such as the utility grid. The EMI filter 110 includes one or more passive and/or active electronic components configured to suppress EMI from the power source 170 from affecting operation of the other components of the power converter 100. In one or more embodiments, the EMI filter 110 is further configured to provide surge protection for the other components of the power converter 100. In one or more embodiments, the EMI filter 110 is omitted from the power converter 100.

The rectifying unit 120 is coupled to the power source 170, either directly or indirectly via the EMI filter 110, to receive power to be converted. The rectifying unit 120 is configured to output a rectified voltage $V_R$ from the power received from the power source 170. In one or more embodiments, the rectifying unit 120 includes diodes D10-D40 connected with each other to define a full-wave rectifier. Other configurations of the rectifying unit 120 are used in further embodiments.

The output stage 130 is coupled to an output 125 of the rectifying unit 120 and configured to convert, under control of the controller 140, the rectified voltage $V_R$ into a DC voltage for a load 180. The output stage 130 includes a transformer T having a primary winding W1 coupled to the output 125 of the rectifying unit 120 to receive the rectified voltage $V_R$, and at least one secondary winding W2 coupled to the load 180. The transformer T further includes an auxiliary secondary winding W2' to provide power for the controller 140.

On the primary winding (W1) side, the output stage 130 further includes a switch MP (also referred to herein as "power switch MP"), a capacitor C10, a resistor R10 and a diode D50. In one or more embodiments, the switch MP includes a power field-effect transistor (FET), such as a double-diffused metal-oxide-semiconductor (DMOS) transistor. In further embodiments, the switch MP includes one or more other suitable devices, such as an insulated-gate bipolar transistor (IGBT), a field effect transistor (FET), etc. The switch MP has a control terminal coupled to the controller 140 to receive a control signal Sc, and first and second terminals coupled to the ground and the primary winding W1. The primary winding W1 has opposite ends coupled to the rectifying unit 120 and the switch MP. The resistor R10 and diode D50 are coupled in series between the switch MP and the output 125 of the rectifying unit 120. The capacitor C10 is coupled in parallel with the resistor R10.

On the secondary winding (W2) side, the output stage 130 further includes a capacitor CL and a diode D60 which are coupled in series between opposite ends of the secondary winding W2 to form a loop. Other configurations of the output stage 130 are used in further embodiments.

The controller 140 generates the control signal Sc for controlling the switch MP to turn ON or OFF. After the switch MP is turned ON by the controller 140, a current flows from the rectifying unit 120, via the primary winding W1 and the switch MP, to the ground. Thus, energy supplied from the rectifying unit 120 is built up and stored in the primary winding W1. The built up energy is proportional to the ON time of the switch MP and the rectified voltage $V_R$. After the switch MP is turned OFF by the controller 140, the energy stored in the primary winding W1 is released into a load 180 via the secondary winding W2 and the diode D60, with the capacitor CL acting as the load capacitor. The diode D50, capacitor C10 and resistor R10 act as primary-side clamps during the energy release from the primary winding W1 to the secondary winding W2. The use of the transformer T for energy transmission shields the load 180 from perturbations or glitches that are potentially present on the power source 170. In at least one embodiment, a frequency at which the controller 140 turns ON/OFF the switch MP is higher than a frequency of the power source 170. For example, the controller 140 turns ON/OFF the switch MP at about 200 kHz given the power source frequency of about 50 Hz.

The controller 140 further monitors the outputted power, voltage and/or current (hereinafter commonly referred to as "output") of the output stage 130 and controls the ON/OFF switching of the switch MP to maintain the output of the output stage 130 at a desired level. The output of the output stage 130 is detected by the feedback circuit 150 which provides an isolated, or non-isolated, feedback signal that is indicative of the detected output. The feedback signal also allows the controller 140 to detect short circuits or other faults or malfunctions on the load side. In at least one embodiment, the feedback signal is compared with a reference voltage, and the difference (also referred to as "error signal") is amplified by a gain stage of the controller 140 to output an amplified error signal. The amplified error signal is used by the controller 140 to control the ON time and, by extension, the effective switching frequency of the switch MP, via the control signal Sc, to thereby control the output of the output stage 130. In some embodiments, the controller 140 further includes circuitry to monitor operation of one or more other components of the power converter 100. For example, the controller 140 in at least one embodiment includes circuitry for monitoring the rectified voltage $V_R$. In at least one embodiment, the monitoring circuitry is provided for such functionality as power sequencing and controller enabling, while ensuring that the controller 140 is in a proper state vis-a-vis the behavior of the rectified voltage $V_R$. In at least one embodiment, the monitoring circuitry becomes fully functional and produces a valid signal from the earliest or smallest possible level of the rectified voltage $V_R$.

The start-up circuit 160 is coupled to the output 125 of the rectifying unit 120, the controller 140, and the auxiliary secondary winding W2' of the transformer T. Upon power-up of the power converter 100, the start-up circuit 160 receives the rectified voltage $V_R$ from the rectifying unit 120, and generates a voltage $V_{PP}$ based on the rectified voltage $V_R$. The voltage $V_{PP}$ is outputted to the controller 140 to provide power for the controller 140 to start the ON/OFF switching of the switch MP. As the switch MP starts switching, the output stage 130 starts outputting power to the load 180 via the secondary winding W2. The power outputted by the output stage 130 is also supplied via the auxiliary secondary winding W2' to the start-up circuit 160. After the power supplied by the output stage 130 via the auxiliary secondary winding W2' reaches a predetermined level, the start-up circuit 160 outputs the voltage $V_{PP}$ based on the power supplied by the output stage 130 for powering further operation of the controller 140. In this aspect, the start-up circuit 160 is configured not only to provide temporary power for the controller 140, but also to perform power management for the controller 140.

FIG. 2 is a schematic circuit diagram of a start-up circuit 200 in accordance with some embodiments. The start-up circuit 200, in one or more embodiments, is usable as the start-up circuit 160 in the power converter 100. The start-up circuit 200 includes an input node 210, a first power section 220, a second power section 230, a selector 240, and an output node 250. The input node 210 is coupled to the output 125 of the rectifying unit 120 to receive the rectified voltage $V_R$ from the rectifying unit 120. The first power section 220 (also referred to herein as "start-up voltage generator") is coupled to the input node 210 and configured to generate a first voltage $V_2$ (also referred to herein as "start-up voltage") from the rectified voltage $V_R$ and to output the first voltage $V_2$ to the controller 140 via the output node 250 to power the controller 140 before the output stage 130 starts outputting power. The second power section 230 is coupled to the output stage 130, via the auxiliary secondary winding W2', and configured to generate a second voltage $V_3$ from power supplied by the output stage 130 after the output stage 130 starts operating. The selector 240 is coupled to the first power section 220 and the second power section 230, and configured to select and output the higher of the first and second voltages $V_2$ and $V_3$, as the voltage $V_{PP}$ and via the output node 250, to the controller 140.

The selector 240 includes a diode D3 and a diode D4. The diode D3 has an anode coupled to the output node 250, and a cathode coupled to a node N2 where the start-up voltage $V_2$ is outputted by the start-up voltage generator 220. The diode D4 has an anode coupled to the output node 250, and a cathode coupled to the second power section 230 via a node N3. Other configurations for the selector 240 are used in further embodiments. For example, in at least one embodiment, one or both of the diode D3 and diode D4 is/are implemented as a plurality of diodes coupled in series.

The second power section 230 includes a capacitor C3 and a diode D5. The diode D5 has an anode coupled to a cathode of the diode D4 via the capacitor C3, and a cathode configured to receive power from the output stage 130. For example, the cathode of the diode D5 is coupled to an end of the auxiliary secondary winding W2', the other end of the auxiliary secondary winding W2' being grounded. The capacitor C3 is coupled between the anode of the diode D5 and the ground. Other configurations of the second power section 230 are used in further embodiments.

The start-up voltage generator 220 includes a transistor M1 and a resistor R1. The transistor M1 has a first terminal coupled to the input node 210, and a second terminal coupled to the node N2. For example, the drain of the transistor M1 is coupled to the input node 210, and the source of the transistor M1 is coupled to the node N2. The transistor M1 further has a gate terminal coupled to a node N1 which is, in turn, coupled to a reference node N4 having a reference voltage, such as the ground voltage. The transistor M1 is a transistor configured to operate in the depletion mode, and is also referred to herein as the depletion mode transistor M1. In one or more embodiments, the depletion mode transistor M1 is an N-channel depletion FET (or an n-type depletion FET) that has a negative threshold voltage $V_{tn}$, unlike standard enhancement mode n-type FETs which have a positive threshold voltage. Other types of transistor are usable as the depletion mode transistor M1 in further embodiments. In at least one embodiment, the depletion mode transistor M1 has a universal power-grid-compatible voltage rating of about 400 to about 800 V.

The operation of the start-up circuit 200 will now be described with reference to both FIG. 2A and FIG. 2B. FIG. 2B is a timing diagram of the operation of the start-up circuit 200 in accordance with some embodiments. It should be noted that FIG. 2B is not drawn to scale. Further, for the sake of simplicity, it is assumed in the following description that the diodes D3-D5 have the same forward voltage $V_F$. However, diodes having different forward voltages are usable as one or more of diodes D3-D5 in various embodiments.

Upon power-up of the power converter 100, the rectifying unit 120 starts outputting the rectified voltage $V_R$, as indicated at time $t_0$ in FIG. 2B. The rectified voltage $V_R$ is supplied via the input node 210 to the start-up voltage generator 220. The depletion mode transistor M1 has the first terminal, e.g., the drain, configured to receive the rectified voltage $V_R$ via the input node 210, and the second terminal, e.g., the source, configured to output a start-up voltage $V_2$ via the node N2 to the controller 140 for powering the controller 140 before the output stage 130 starts outputting power. The depletion mode transistor M1 functions as a source follower that delivers power from the input node 210 to the node N2. Specifically, as indicated in FIG. 2B, the start-up voltage $V_2$ at the source of the depletion mode transistor M1 follows the rectified voltage $V_R$ at the drain of the depletion mode transistor M1, and rises together with the rectified voltage $V_R$ during a first rising edge 301 of the rectified voltage $V_R$. When the rectified voltage $V_R$ exceeds the sum of $|V_{tn}|+V_{d,sat}$, as indicated at time $t_1$ in FIG. 2B, the start-up voltage $V_2$ is equal to $|V_{tn}|$. The voltage $V_{d,sat}$ is a minimum drain-source overdrive voltage at which the depletion mode transistor M1 enters the saturation region. When the rectified voltage $V_R$ is at or below $|V_{tn}|+V_{d,sat}$, as indicated at Δt in FIG. 2B, the start-up voltage $V_2$ tracks the rectified voltage $V_R$ as the depletion mode transistor M1 leaves the saturation region and enter into the linear region. The resistor R1 is selected to set a minimum current through the source follower to maintain a predetermined bandwidth for the source follower and improve the transient recovery of the source follower.

The period Δt during which the start-up voltage $V_2$ is below the level $|V_{tn}|$ is small compared to the period during which the start-up voltage $V_2$ is at the level $|V_{tn}|$. For example, in at least one particular embodiment, the peak level of the rectified voltage $V_R$ is about 240 V, $|V_{tn}|$ is about 11-12 V, $V_F$ is about 0.7 V, and $V_{d,sat}$ is about 0.2 V. In the particular embodiment, for most of the cycle, $V_R$ is greater than $|V_{tn}|$, i.e., greater than about 11.2-12.2 V. As a result, the start-up voltage $V_2$, for most of the cycle, is constant at the level of $|V_{tn}|$ of about 11-12 V. The short periods Δt during which the start-up voltage $V_2$ falls below the level of $|V_{tn}|$ are insignificant compared to the periods during which $|V_{tn}|$ are insignificant compared to the periods during which the start-up voltage $V_2$ is at the level of $|V_{tn}|$. As a result, a periodically intermittent start-up power rail of relatively good quality is provided at the node N2. The start-up voltage $V_2$ is defined by the threshold voltage $V_{tn}$ of the depletion mode transistor M1. In some embodiments, the depletion mode transistor M1 is configured to have the threshold voltage $V_{tn}$ of a predetermined level by appropriately selecting the dopant type and/or dopant rate of dopants in one or more of the source and drain regions of the depletion mode transistor M1.

Upon start-up of the power converter 100, the output stage 130 does not yet start outputting power. The start-up voltage $V_2$ is provided in this start-up phase for powering the controller 140 to start the switching ON/OFF of the switch MP in the output stage 130. The start-up voltage $V_2$ is outputted from the node N2, via the diode D3 and the output node 250 to the controller 140. In other words, the voltage $V_{PP}$ is about equal to $V_2$ (minus the forward voltage $V_F$ of the diode D3) during the start-up phase.

As indicated in FIG. 2B, during a first rising period 241, the voltage $V_{PP}$ starts rising with the start-up voltage $V_2$ and charges the capacitor C2 via the diode D3. During a subsequent period 242, the voltage $V_{PP}$ reaches a level of a diode forward voltage $V_F$ below the constant level $|V_{tn}|$ of the start-up voltage $V_2$. During a period 243 corresponding to the period Δt when the start-up voltage $V_2$ falls below the constant level of $|V_{tn}|$, the voltage $V_{PP}$ drops slightly. The capacitor C2 is selected to have a sufficient capacitance for holding charge and maintaining the voltage $V_{PP}$ at about the same level of $|V_{tn}|-V_F$ during the period 243. In at least one embodiment, the capacitor C2 is sufficiently large to sustain a ground current of the controller 140. In various embodiments, the short duration and the slight voltage drop of the period 243 are insignificant, and the voltage $V_{PP}$ is considered as a power rail of relatively high quality for powering the controller 140 during the start-up phase. The diode D3 provides a reverse-blocking path between the output node 250 and the node N2 to prevent the capacitor C2 from discharging through the resistor R1 after the start-up voltage $V_2$ drops below the voltage $V_{PP}$, e.g., during the period 243.

In at least one embodiment, the voltage $V_{PP}$ reaches the level (which is approximately equal to the constant level $|V_{tn}|$ of the start-up voltage $V_2$ less a diode forward voltage $V_F$) within the first cycle of the rectified voltage $V_R$. In at least one embodiment, during the first rising edge 241 of the rectified voltage $V_R$, the voltage $V_{PP}$ reaches a level sufficient to power at least one circuit of the controller 140. For example, during the first rising edge 241 of the rectified voltage $V_R$, the voltage $V_{PP}$ reaches a level sufficient to power the circuitry that monitors the rectified voltage $V_R$.

After the controller 140 starts the ON/OFF switching of the switch MP, the output stage 130 starts outputting power to the second power section 230 via the auxiliary secondary winding W2'. The energy released from the primary winding W1 to the auxiliary secondary winding W2' starts building up charge in the capacitor C3 via the diode D5. As a result, a second voltage $V_3$ at the node N3 starts to rise. After a sufficient number of cycles has passed, the second voltage $V_3$ reaches a level that is higher than the maximum level of the start-up voltage $V_2$ at the output of the source follower. In some embodiments, this arrangement is achieved by selecting a proper winding ratio between the primary winding W1 and the auxiliary secondary winding W2'. The capacitor C3 is selected to maintain the second voltage $V_3$ at a constant, steady-state level, thereby providing a steady-state power rail for the controller 140 at the node N3 after the start-up phase. The diode D5 provides a reverse-blocking function to prevent the energy or charge stored in the capacitor C3 from discharging back to the auxiliary secondary winding W2' of the transformer T when the auxiliary secondary winding W2' is not delivering energy to the capacitor C3.

The handoff mechanism between the start-up power rail, i.e., the start-up voltage (first voltage) $V_2$ at the node N2, and the steady-state power rail, i.e., the second voltage $V_3$ at the node N3, is achieved via the selector 240 which is a maximum selector that selects and outputs the higher of the start-up voltage $V_2$ and the second voltage $V_3$ to the output node 250 as the voltage $V_{PP}$. In other words, $V_{PP} = \max(V_2, V_3) - V_F$.

As the second voltage $V_3$ rises and exceeds the start-up voltage $V_2$, the diode D4 of the selector 240 is forward-biased and delivers power from the second power section 230 to the output node 250, whereas the diode D3 of the selector 240 is reverse-biased and stops conducting power from the start-up voltage generator (first power section) 220 to the output node 250. As a result, the voltage $V_{PP}$ is equal to the second voltage $V_3$. In some situations as indicated in FIG. 2B, the second voltage $V_3$ reaches an intermediate level $V_{3p}$ that temporarily exceeds the start-up voltage $V_2$ but not yet reaches the higher steady-state level $V_{3s}$. In such situations, the voltage $V_{PP}$ becomes temporarily defined, as indicated at 245 in FIG. 2B, by the intermediate level $V_{3p}$ of the second voltage $V_3$ before reverting back, as indicated at 246 in FIG. 2B, to the level defined by the start-up voltage $V_2$. When the second voltage $V_3$ reaches the steady-state level $V_{3s}$, the voltage $V_{PP}$ is defined by that level, as indicated at 247 in FIG. 2B, and remains at the steady-state level $V_{3s}$ during subsequent operations of the power converter 100. In at least one particular embodiment, the steady-state level of the second voltage $V_3$ is about 15-20 V.

Once the second voltage $V_3$ has reached the steady-state level that exceeds the maximum level of the start-up voltage $V_2$, the second power section 230 takes over the delivery of the voltage $V_{PP}$ to the output node 250, and acts as the power supply for the controller 140. The steady-state level of the second voltage $V_3$ provides a steady-state power rail that is more efficient than the start-up power rail provided by the start-up voltage $V_2$. After the second power section 230 takes over the delivery of the voltage $V_{PP}$ to the output node 250, the power dissipation through the start-up voltage generator 220 is defined by the resistor R1. The current through the resistor R1 is approximately given by $(|V_{tn}|)/R1$ and is kept small, in at least one embodiment, to minimize power consumption of the start-up circuit 200.

In one or more embodiments, the use of the depletion mode transistor M1 provides good headroom performance and/or fast charge buildup on the voltage $V_{PP}$ during the start-up phase before the output stage 130 starts outputting power. The good headroom performance indicates a low level of the rectified voltage $V_R$ at which the voltage $V_{PP}$ (which is approximately slightly below the start-up voltage $V_2$) reaches a level sufficient to power the operation of at least one circuit of the controller 140. In at least one particular embodiment, after power-up of the power converter 100, as soon as the rectified voltage $V_R$ reaches a level of about 15-20V (i.e., under 10% of its peak level of about 240 V) during the first rising edge of the rectified voltage $V_R$, the voltage $V_{PP}$ is already at a level of a few volts that is sufficient to power the operation of at least one circuit in the controller 140. The fast charge buildup on the voltage $V_{PP}$ indicates a short time for the voltage $V_{PP}$ (which is approximately equal to the start-up voltage $V_2$ less a diode forward voltage $V_F$) to reach the constant level of about $|V_{tn}| - V_F$. In at least one particular embodiment, the voltage $V_{PP}$ or start-up voltage $V_2$ reaches the constant level within one or two cycles of the rectified voltage $V_R$ after the power-up of the power converter 100. The good headroom performance and/or fast charge buildup on the voltage $V_{PP}$ during the start-up phase ensure(s) that, in one or more embodiments, at least one, or most, or all circuits of the controller 140 is/are powered by the voltage $V_{PP}$ as soon as possible.

In one or more embodiments, the use of the selector 240 provides a smooth handoff from the start-up phase, when the controller is powered by a periodically intermittent start-up power rail provided by the start-up voltage $V_2$, to the steady-state phase, when the controller is powered by a steady-state power rail provided by the second voltage $V_3$. Thus, in at least one embodiment, a start-up power rail of relatively high quality provided by the start-up voltage $V_2$ is ensured during the start-up phase, whereas a steady-state power rail which is highly efficient is ensured during the subsequent, steady-state phase of the operation of the power converter 100.

In one or more embodiments, the start-up voltage generator 220 alone, or in combination with the second power section 230 and the selector 240, functions as the corresponding voltage pre-regulator disclosed in U.S. patent application Ser. No. 13/672,304.

Figure 2A:
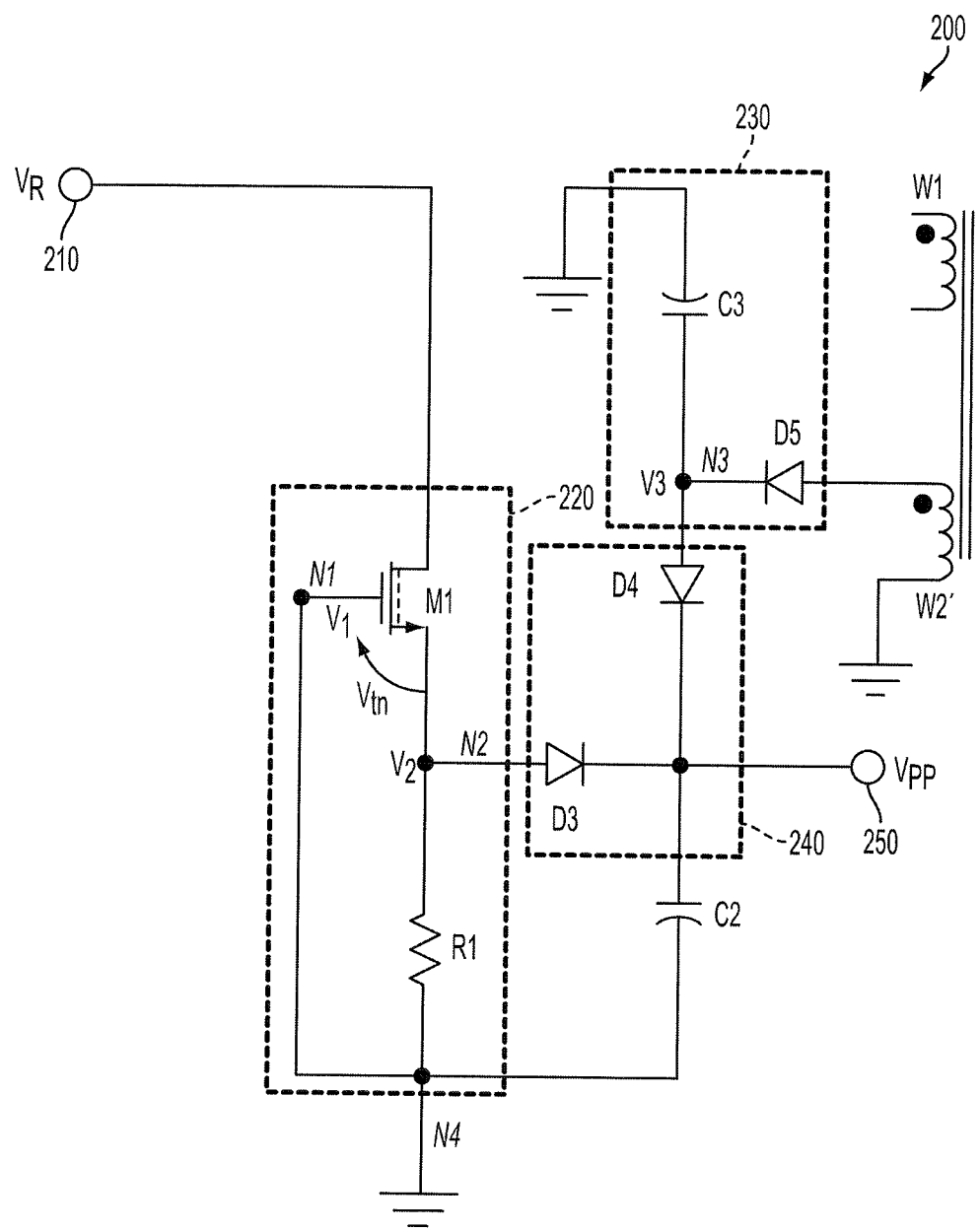
FIG. 2A is a schematic circuit diagram and FIG. 2B is a timing diagram of a start-up circuit in accordance with some embodiments.
Figure 2B:
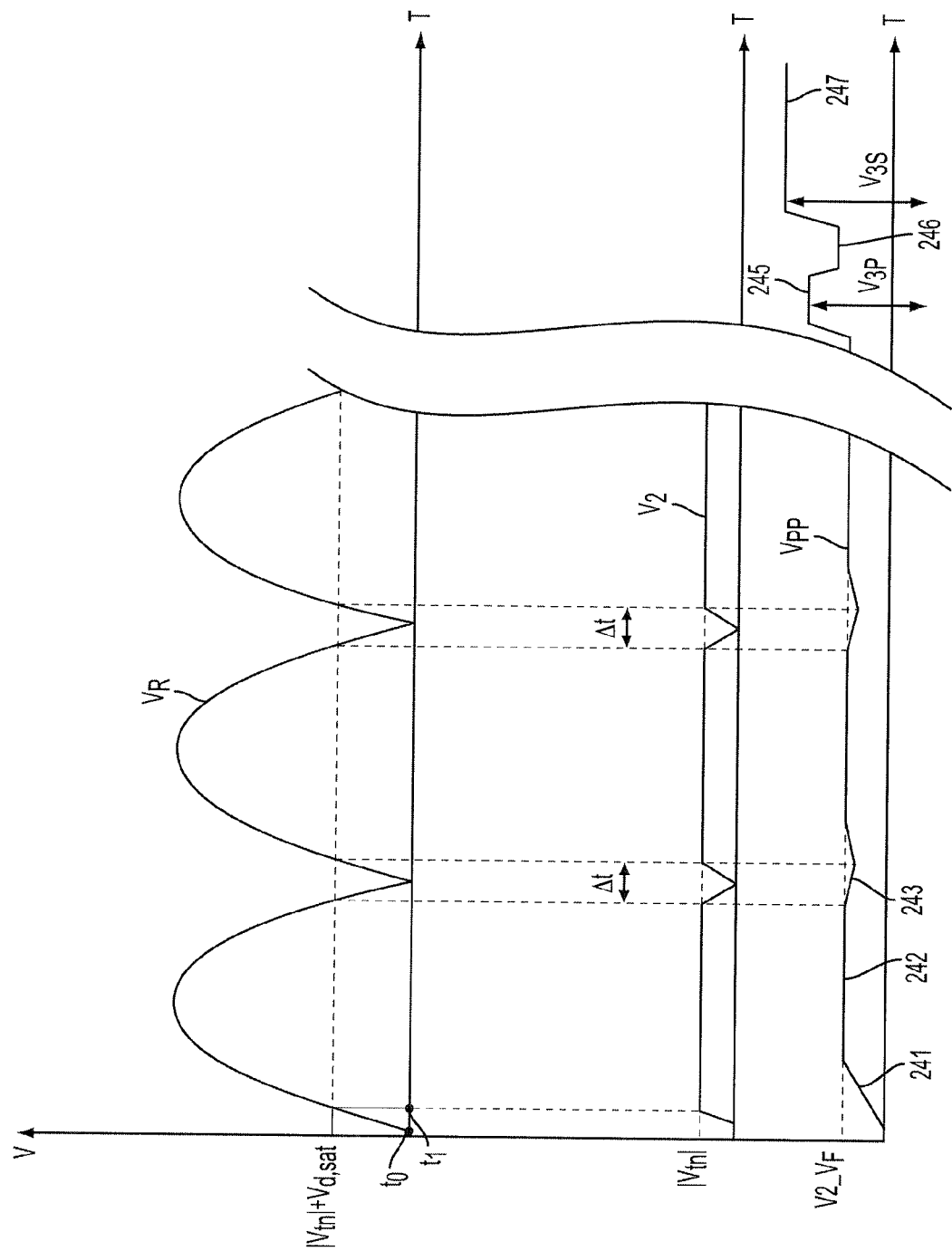

In the embodiment(s) disclosed with respect to FIGS. 2A-2B, the start-up voltage $V_2$ is generated by a single depletion mode transistor M1. The start-up voltage $V_2$ is defined by the absolute value $|V_{tn}|$ of the threshold voltage $V_{tn}$ of the depletion mode transistor M1 In some situations, $|V_{tn}|$ is lower than an intended level for the start-up voltage $V_2$. To boost the start-up voltage $V_2$ to have the intended level, the gate terminal (i.e., the node N1) of the depletion mode transistor M1 is biased with a voltage $V_1$ which, in the specific embodiment disclosed in FIGS. 2A-2B, is the reference voltage, e.g., the ground voltage, at the reference node N4. By applying a voltage $V_1$ other than the ground voltage to the gate terminal of the depletion mode transistor M1, the start-up voltage $V_2$ is creased to $V_1 + |V_{tn}|$. One or more approaches for generating the voltage $V_1$ is/are described in U.S. patent application Ser. No. 13/598,288, i.e., by using a zener diode. Some embodiments in the instant disclosure provide one or more further approaches for generating the voltage $V_1$ by using one or more additional depletion mode transistors coupled in cascade with the depletion mode transistor M1. Each of the depletion mode transistors coupled in cascade (including the depletion mode transistor M1) is configured to generate a voltage being a fraction of the start-up voltage $V_2$, and the voltages generated by the depletion mode transistors are added up to obtain the start-up voltage $V_2$ at the node N2. In one or more embodiments, n cascades each comprising a depletion mode transistor are coupled in series to generate the start-up voltage $V_2$, where n is a positive integer greater than 1. Example configurations with n=2 and n=3 are described herein with respect to FIGS. 3A and 4, respectively. Other values of n, i.e., other numbers of cascades, are within the scope of various embodiments.

Figure 3A:
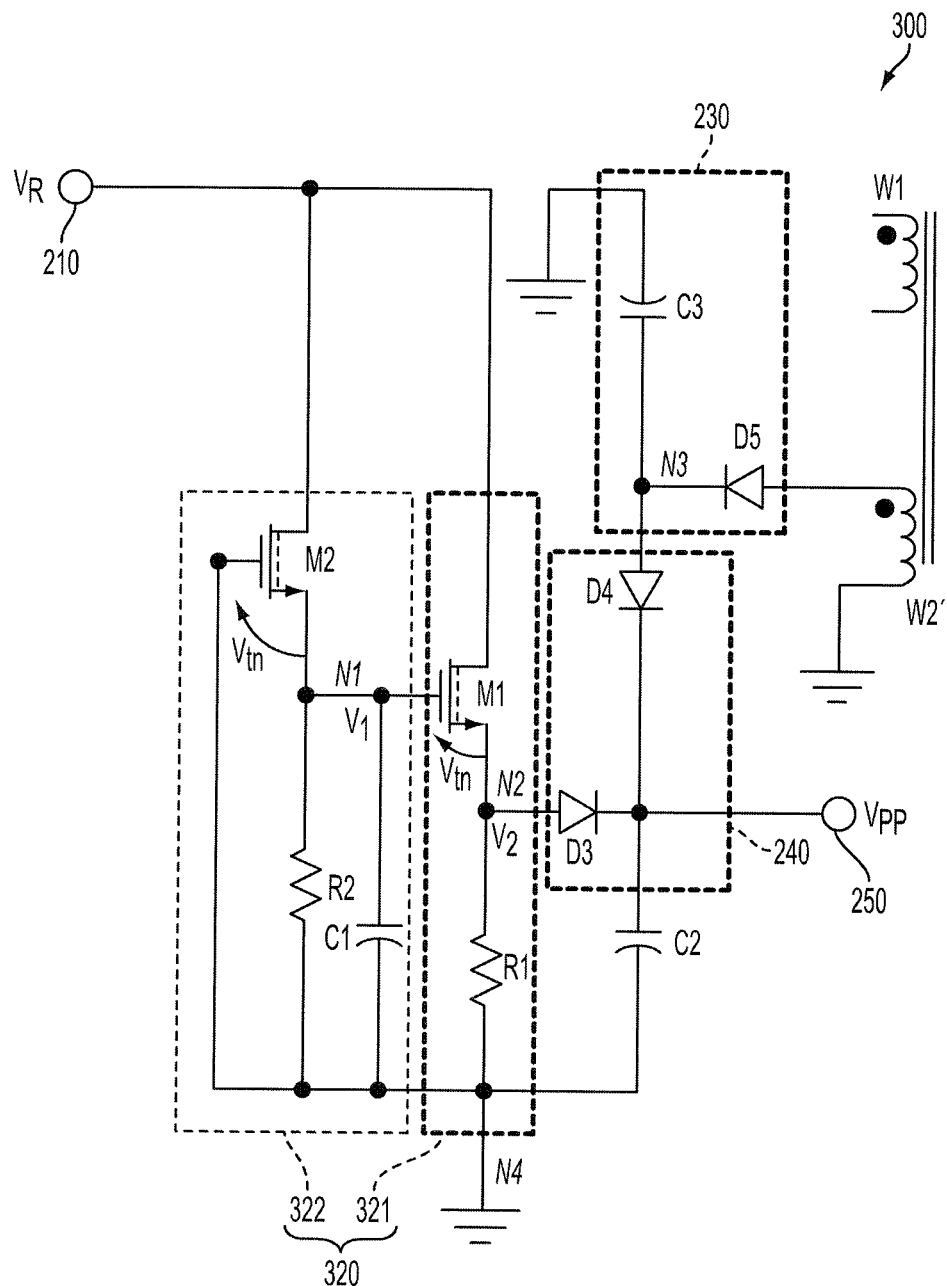
FIG. 3A is a schematic circuit diagram and FIG. 3B is a timing diagram of a start-up circuit in accordance with some embodiments.

FIG. 3A is a schematic circuit diagram of a start-up circuit 300 in accordance with some embodiments. The start-up circuit 300, in one or more embodiments, is usable as the start-up circuit 160 in the power converter 100. The start-up circuit 300 is different from the start-up circuit 200 disclosed with respect to FIG. 2A in the configuration of a start-up voltage generator 320. Specifically, the start-up voltage generator 320 includes two cascades, i.e., a first cascade 321 and a second cascade 322, corresponding to n=2. Each of the first cascade 321 and second cascade 322 includes a depletion mode transistor, namely, the depletion mode transistor M1 and a depletion mode transistor M2, respectively. Each of the depletion mode transistors M1, M2 has a first terminal, e.g., a drain, coupled to the input node 210, a second terminal (e.g., a source), and a gate terminal. The second terminal of the depletion mode transistor M1 in the first cascade 321 is coupled to the node N2 which is an output node of the start-up voltage generator 320. The second terminal of the depletion mode transistor M2 in the second cascade 322 is coupled to the gate terminal of the depletion mode transistor M1 in the first cascade 321. The gate terminal of the depletion mode transistor M2 in the second cascade 322 is coupled to the reference node N4. Each of the cascades 321, 322 further comprises a resistor R1, R2 coupled between the reference node N4 and the second terminal of the corresponding depletion mode transistor M1, M2. The second cascade 322 further includes a capacitor C1 coupled in parallel with the corresponding resistor R2.

Figure 3B:
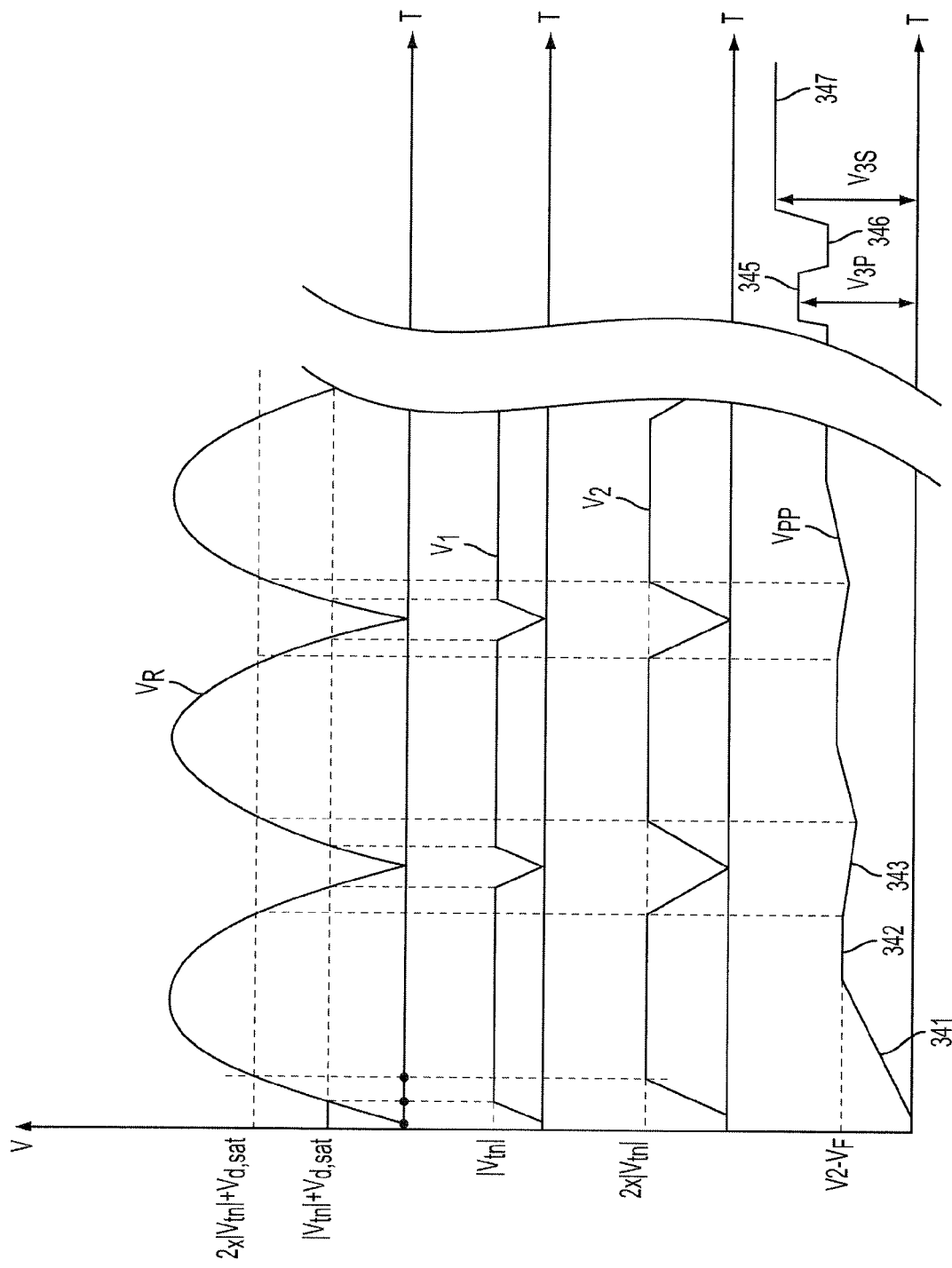

The operation of the start-up circuit 300 will now be described with reference to both FIG. 3A and FIG. 3B. FIG. 3B is a timing diagram of the operation of the start-up circuit 300 in accordance with some embodiments. It should be noted that FIG. 3B is not drawn to scale. Further, for the sake of simplicity, it is assumed in the following description that the depletion mode transistors M1 and M2 have the same threshold voltage $V_{tn}$. However, depletion mode transistors having different threshold voltages are usable as the depletion mode transistors M1, M2 in various embodiments.

Upon power-up of the power converter 100, the rectifying unit 120 starts outputting the rectified voltage $V_R$. The depletion mode transistor M2 functions as a source follower similarly to the depletion mode transistor M1 described with respect to FIGS. 2A-2B. As a result, the voltage $V_1$ outputted at the second terminal of the depletion mode transistor M2 follows the rectified voltage $V_R$ when the rectified voltage $V_R$ is at or below the sum of $|V_{tn}|+V_{d,sat}$. The voltage $V_1$ is equal to $|V_{tn}|$ when the rectified voltage $V_R$ exceeds $|V_{tn}|+V_{d,sat}$ as indicated in FIG. 3B.

The voltage $V_1$ is supplied to the gate terminal of the depletion mode transistor M1 to bias the gate terminal of the depletion mode transistor M1. As a result, the start-up voltage $V_2$ at the second terminal (i.e., the node N2) of the depletion mode transistor M1 is increased by the voltage $V_1$ compared to the start-up voltage $V_2$ in the start-up circuit 200 disclosed with respect to FIGS. 2A-22B. Specifically, the depletion mode transistor M1 functions as a source follower and, as a result, the voltage $V_2$ follows the rectified voltage $V_R$ when the rectified voltage $V_R$ is at or below the sum of $2\times|V_{tn}|+V_{d,sat}$. The voltage $V_2$ is equal to $2\times|V_{tn}|$ when the rectified voltage $V_R$ exceeds $2\times|V_{tn}|+V_{d,sat}$ as indicated in FIG. 3B.

The start-up voltage $V_2$ is supplied to the controller 140 as the voltage $V_{PP}$ during the start-up phase and is then replaced by the second voltage $V_3$ during the steady state phase as described with respect to FIGS. 2A-2B. The voltage $V_{PP}$ includes one or more variations indicated in FIG. 3B as 341, 342, 343, 345, 346, 347 corresponding to the variations 241, 242, 243, 245, 246, 247 described with respect to FIG. 2B.

The variations of the voltage $V_1$ illustrated in FIG. 3B are for situations where the capacitor C1 is not included in the second cascade 322. In one or more embodiments which include the capacitor C1 in the second cascade 322, the first capacitor C1 is selected to have a sufficient capacitance for holding charge and maintaining the voltage $V_1$ at about $|V_{tn}|$ during periods when the rectified voltage $V_R$ is at or drops below $|V_{tn}|+V_{d,sat}$. As a result, a substantially constant voltage $V_1$ with the level of $|V_{tn}|$ is presented at the gate terminal of the depletion mode transistor M1. The resistors R1 and R2 are current limiting resistors as described with respect to the resistor R1 in the start-up circuit 200.

As described with respect to FIG. 3B, the start-up voltage $V_2$ outputted by the start-up voltage generator 320 is defined as $2\times|V_{tn}|$. A fraction $|V_{tn}|$ of the start-up voltage $V_2$ is generated by the depletion mode transistor M1 while the depletion mode transistor M2 generates another fraction $|V_{tn}|$ of the start-up voltage $V_2$. In other words, the start-up voltage $V_2$ is equal to a sum of the threshold voltages $V_{tn}$ generated by the depletion mode transistors M1 and M2. Compared to the start-up circuit 200 with the start-up voltage of it is easier and/or more flexible, in some embodiments, to design the start-up circuit 300 with the start-up voltage of $2\times|V_{tn}|$ to meet a specific intended level for the start-up voltage. In some embodiments, the depletion mode transistors in the start-up circuit 300 are arranged to provide a fraction, e.g., about a half, of the intended level of the start-up voltage and are therefore subject to less stringent manufacturing considerations than when a single depletion mode transistor is arranged to provide the whole intended level of the start-up voltage as in the start-up circuit 200. Further, compared to other approaches where a zener diode, i.e., a device of a different type from the depletion mode transistor M1, is used to provide a bias voltage for the depletion mode transistor M1, the start-up circuit 300 includes another depletion mode transistor M2, i.e., a device of a similar type to the depletion mode transistor M1, for generating the bias voltage. In accordance with some embodiments, it is possible to manufacture the depletion mode transistor M2 during the same processes and/or using the same masks as the depletion mode transistor M1, thereby simplifying the manufacturing process of the start-up circuit 300.

Figure 4:
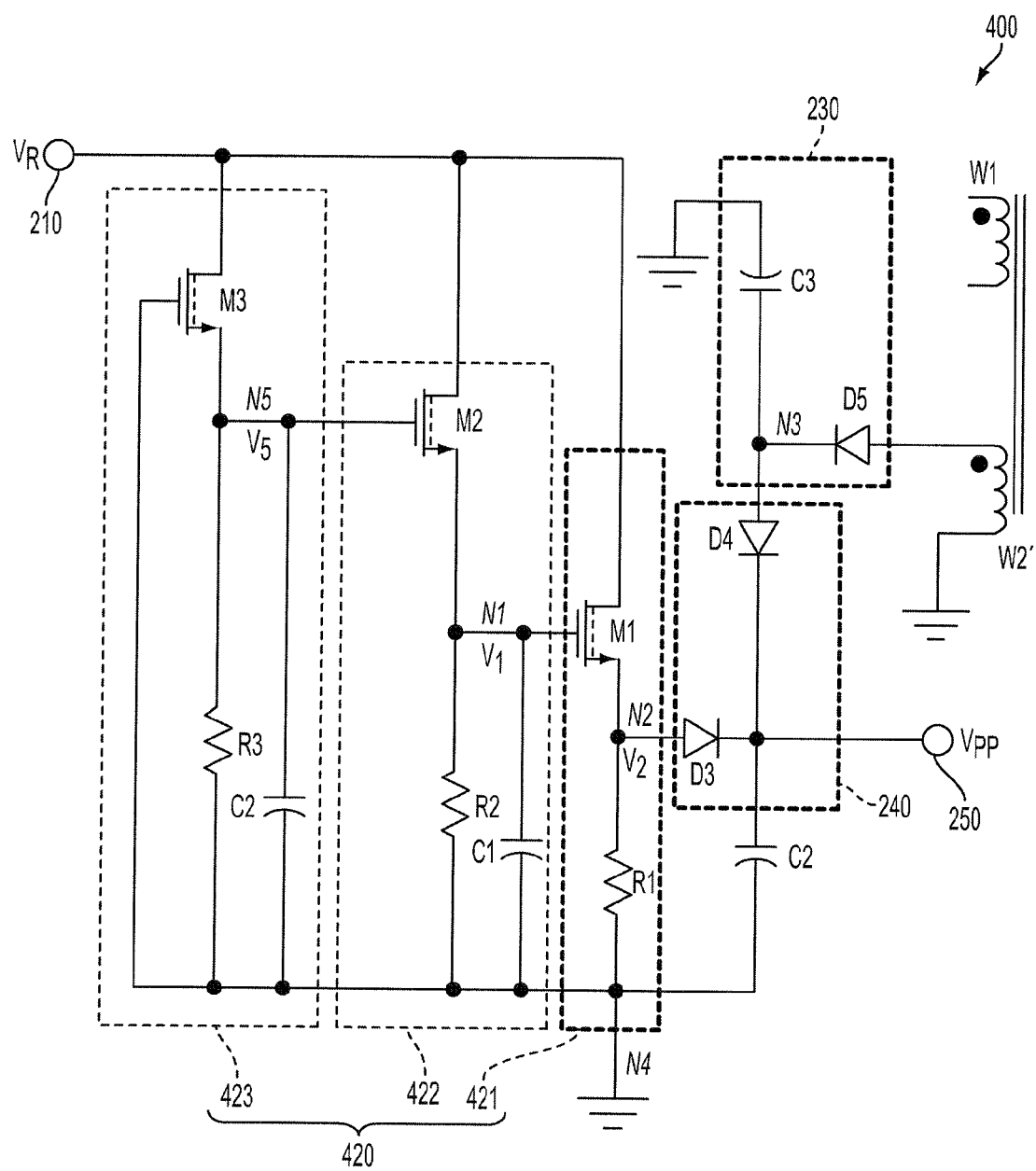
FIG. 4 is a schematic circuit diagram of a start-up circuit in accordance with some embodiments.

FIG. 4 is a schematic circuit diagram of a start-up circuit 400 in accordance with some embodiments. The start-up circuit 400, in one or more embodiments, is usable as the start-up circuit 160 in the power converter 100. The start-up circuit 400 is different from the start-up circuit 300 disclosed with respect to FIG. 3A in the configuration of a start-up voltage generator 420. Specifically, the start-up voltage generator 420 includes three cascades, i.e., a first cascade 421, a middle cascade 422, and a last cascade 423, corresponding to n=3. The first cascade 421 is configured and operates similarly to the first cascade 321 of the start-up circuit 300 described with respect to FIG. 3A. The last (or $n^{th}$) cascade 423, which includes a depletion mode transistor M3, a resistor R3 and a capacitor C2, is configured and operates similarly to the second cascade 322 of the start-up circuit 300. The middle cascade 422 is similar to the second cascade 322 of the start-up circuit 300, except that the gate terminal of the depletion mode transistor M2 is connected to a second terminal of the third transistor M3 via a node N5, rather than to the reference node N4 as in the start-up circuit 300. In some embodiments with n>3, multiple middle cascades similar to the middle cascade 422 are coupled in series between the last cascade 423 and the first cascade 421. In each middle cascade, i.e., an $i^{th}$ cascade where i is a positive integer from 2 to (n−1), a second terminal of the corresponding depletion mode transistor is coupled to the gate terminal of the depletion mode transistor in the $(i-1)^{th}$ cascade. For example, in the middle cascade 422 (n=3, i=2), the second terminal of the corresponding depletion mode transistor M2 is coupled to the gate terminal of the depletion mode transistor M1 in the first cascade (because i−1=1).

The operation of the start-up circuit 400 is similar to the operation of the start-up circuit 300 described with respect to FIG. 3B. Specifically, the depletion mode transistor M3 of the last cascade 423 generates at the node N5 a voltage $V_5$ defined by the threshold voltage $V_{tn}$ of the depletion mode transistor M3. The voltage $V_5$ is maintained by the capacitor C2 at the steady level of $|V_{tn}|$ during periods when the rectified voltage $V_R$ drops low. The voltage $V_5$ is applied a bias voltage to the gate terminal of the depletion mode transistor M2 in the middle cascade 422. The bias voltage $V_5$ (i.e., $|V_{tn}|$) is added to the threshold voltage $|V_{tn}|$ of the depletion mode transistor M2, and the voltage $V_1$ of $2 \times |V_{tn}|$ is outputted at the second terminal of the depletion mode transistor M2. The voltage $V_1$ is maintained by the capacitor C1 at the steady level of $2 \times |V_{tn}|$ during periods when the rectified voltage $V_R$ drops low. The voltage $V_1$ is applied a bias voltage to the gate terminal of the depletion mode transistor M1 in the first cascade 421. The bias voltage $V_1$ (i.e., $2 \times |V_{tn}|$) is added to the threshold voltage $|V_{tn}|$ of the depletion mode transistor M1, and the voltage $V_2$ of $3 \times |V_{tn}|$ is outputted at the second terminal of the depletion mode transistor M1 as the start-up voltage. Thus, each of the depletion mode transistors M1-M3 generates a fraction, i.e., $|V_{tn}|$, of the start-up voltage $3 \times |V_{tn}|$. The resistors R1-R3 are current limiting resistors as described with respect to the resistor R1 in the start-up circuit 200.

In the start-up circuit 400 corresponding to n=3, the start-up voltage $V_2$ outputted by the start-up voltage generator 420 is defined as $3 \times |V_{tn}|$. In other words, the start-up voltage $V_2$ is $n \times |V_{tn}|$ and is defined by the number n of cascades coupled in series in the start-up voltage generator 420. By varying the number n of cascades coupled in series, the start-up voltage is changed to meet a specific intended level of the start-up voltage and/or to meet certain manufacturing considerations. Therefore, embodiments with multiple cascades described herein provide design and/or manufacture flexibility.

Figure 5:
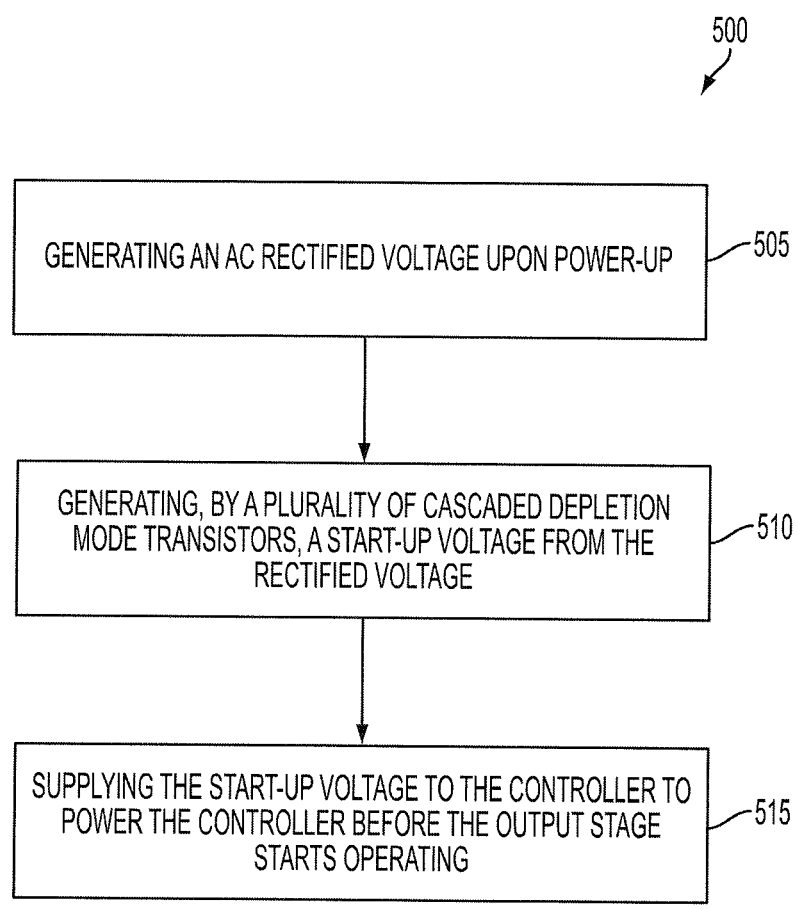
FIG. 5 is a flow chart of a method of starting-up a power converter in accordance with some embodiments.

FIG. 5 is a flow chart of a method 500 of starting-up a power converter in accordance with some embodiments. In one or more embodiments, the method 500 is performed by a start-up circuit, such as the start-up circuit 300 or 400 described herein, to start-up a power converter, such as the power converter 100 described herein.

At operation 505, an AC rectified voltage is generated upon power-up of the power converter. For example, the rectified voltage $V_R$ is generated upon power-up of the power converter 100, as described herein.

At operation 510, a start-up voltage is generated from the rectified voltage by a plurality of cascaded depletion mode transistors. For example, the start-up voltage $V_2$ is generated from the rectified voltage $V_R$ by a plurality of cascaded depletion mode transistors M1, M2 as in the start-up circuit 300, or by a plurality of cascaded depletion mode transistors M1-M3 as in the start-up circuit 400. In some embodiments, more than three depletion mode transistors are coupled in cascade to generate the start-up voltage, as described herein.

At operation 415, the start-up voltage is supplied to a controller of the power converter to power the controller before an output stage of the power converter starts operating. For example, the controller 140 is powered by the start-up voltage $V_2$, e.g., via the selector 240, before the output stage 130 starts outputting power, as described herein.

The above method(s) include(s) example operations, which are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, an AC-DC power converter comprises a rectifying unit configured to rectify an AC voltage to a rectified voltage, an output stage coupled to the rectifying unit and configured to convert the rectified voltage into a DC voltage for a load, a controller coupled to the output stage and configured to control the output stage, and a start-up circuit. The start-up circuit comprises a start-up voltage generator which is coupled to the rectifying unit and configured to generate a start-up voltage from the rectified voltage and to output the start-up voltage to the controller to provide power for operation of the controller before the output stage starts outputting power. The start-up voltage generator comprises a first depletion mode transistor having a first terminal configured to receive the rectified voltage, a second terminal configured to output at least partially the start-up voltage, and a gate terminal which is grounded.

According to some embodiments, a start-up circuit for a power converter comprises an input node, an output node, a reference node, and n cascades coupled in series, where n is a positive integer greater than 1. Each of the cascades comprises a depletion mode transistor having a first terminal coupled to the input node, a second terminal and a gate terminal. The second terminal of the depletion mode transistor in the first cascade is coupled to the output node. The second terminal of the depletion mode transistor in the $i^{th}$ cascade is coupled to the gate terminal of the depletion mode transistor in the $(i-1)^{th}$ cascade, where i is a positive integer from 2 to (n-1). The gate terminal of the depletion mode transistor in the $n^{th}$ cascade is coupled to the reference node.

According to some embodiments, in a method of starting-up a power converter, an AC rectified voltage is generated upon power-up of the power converter. A plurality of depletion mode transistors coupled in cascade generate a start-up voltage from the rectified voltage. The start-up voltage is supplied to a controller of the power converter to provide power for operation of the controller before an output stage of the power converter starts outputting power.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An AC-DC power converter, comprising:
   a rectifying unit configured to rectify an AC voltage to a rectified voltage;
   an output stage coupled to the rectifying unit and configured to convert the rectified voltage into a DC voltage for a load;
   a controller coupled to the output stage and configured to control the output stage; and
   a start-up circuit comprising a start-up voltage generator which is coupled to the rectifying unit and configured to generate a start-up voltage from the rectified voltage and to output the start-up voltage to the controller to provide power for operation of the controller before the output stage starts outputting power;
   wherein the start-up voltage generator comprises a first depletion mode transistor having a first terminal configured to receive the rectified voltage, a second terminal configured to output at least partially the start-up voltage, and a gate terminal configured to receive a ground voltage throughout an entirety of a power-up of the AC-DC power converter from a powered-down state to a steady-state.

2. The AC-DC power converter of claim 1, wherein the start-up voltage generator further comprises a resistor coupled between the second terminal of the first depletion mode transistor and a ground, the gate terminal of the first depletion mode transistor coupled to the ground.

3. The AC-DC power converter of claim 1, wherein the first depletion mode transistor is configured to generate the start-up voltage at the second terminal.

4. The AC-DC power converter of claim 1, wherein the first depletion mode transistor is configured to generate a first voltage which is a fraction of the start-up voltage at the second terminal; and the start-up voltage generator further comprises a second depletion mode transistor configured to generate a second voltage which is another fraction of the start-up voltage.

5. The AC-DC power converter of claim 4, wherein the second depletion mode transistor has:

a gate terminal coupled to the second terminal of the first depletion mode transistor, a first terminal coupled to receive the rectified voltage, and a second terminal configured to output a voltage which is a sum of the first and second voltages.

6. The AC-DC power converter of claim 5, wherein the start-up voltage generator further comprises a first capacitor coupled between the gate terminal of the second depletion mode transistor and a ground.

7. The AC-DC power converter of claim 6, wherein the start-up voltage generator further comprises:

a first resistor coupled between the second terminal of the first depletion mode transistor and the ground, and a second resistor coupled between the second terminal of the second depletion mode transistor and the ground.

8. The AC-DC power converter of claim 5, wherein the start-up voltage generator further comprises a third depletion mode transistor configured to generate a third voltage which is a further fraction of the start-up voltage.

9. The AC-DC power converter of claim 8, wherein the third depletion mode transistor has:

a gate terminal coupled to the second terminal of the second depletion mode transistor, a first terminal coupled to receive the rectified voltage, and a second terminal configured to output a voltage which is a sum of the first through third voltages.

10. The AC-DC power converter of claim 9, wherein the start-up voltage generator further comprises:

a first capacitor coupled between the gate terminal of the second depletion mode transistor and a ground, a second capacitor coupled between the gate terminal of the third depletion mode transistor and the ground, and first through third resistors each coupled between the ground and the second terminal of the corresponding first through third depletion mode transistors.

11. A start-up circuit for a power converter, the start-up circuit comprising:

an input node configured to have a first voltage, an output node, and a reference node; and n cascades coupled in series, where n is a positive integer greater than 1, each of the cascades comprising a depletion mode transistor having a first terminal, a second terminal, and a gate terminal, the first terminal of each depletion mode transistor being coupled to the input node, thereby having the first voltage, wherein the second terminal of the depletion mode transistor in the first cascade is coupled to the output node, the second terminal of the depletion mode transistor in the $i^{th}$ cascade is coupled to the gate terminal of the depletion mode transistor in the $(i-1)^{th}$ cascade, where i is a positive integer from 2 to (n-1), and the gate terminal of the depletion mode transistor in the $n^{th}$ cascade is coupled to the reference node.

12. The start-up circuit of claim 11, wherein each of the cascades further comprises a resistor coupled between the reference node and the second terminal of the corresponding depletion mode transistor.

13. The start-up circuit of claim 12, wherein each of the second through $n^{th}$ cascades further comprises a capacitor coupled in parallel with the corresponding resistor.

14. The start-up circuit of claim 11, wherein each of the second through $n^{th}$ cascades further comprises a capacitor coupled between the reference node and the second terminal of the corresponding depletion mode transistor.

15. The start-up circuit of claim 11, wherein the depletion mode transistors are depletion mode field-effect transistors (FET).

16. The start-up circuit of claim 15, wherein the FETs are N-channel depletion mode FETs.

17. The start-up circuit of claim 11, wherein each of the depletion mode transistors has a negative threshold voltage, the start-up circuit configured to generate at the output node an output voltage equal to a sum of the threshold voltages of the depletion mode transistors.

18. A method of starting-up a power converter, the method comprising:

generating an AC rectified voltage at an input node upon power-up of the power converter;

generating, by a plurality of depletion mode transistors coupled in cascade, a start-up voltage from the rectified voltage, each depletion mode transistor of the plurality of depletion mode transistors receiving the rectified voltage at the input node; and supplying the start-up voltage to a controller of the power converter to provide power for operation of the controller before an output stage of the power converter starts outputting power.

19. The method of claim 18, wherein the depletion mode transistors are depletion mode field-effect transistors (FET).

20. The method of claim 18, wherein the start-up voltage is equal to a sum of threshold voltages of the depletion mode transistors.

* * * * *